(12) United States Patent
Gonzales et al.

(10) Patent No.: US 7,418,184 B1
(45) Date of Patent: Aug. 26, 2008

(54) FIBER OPTIC CATEGORIZATION AND MANAGEMENT TRAY

(76) Inventors: Curtis Paul Gonzales, 1435 N. Weldon Pl., Eagle, ID (US) 83616; Tony L. Brown, 1206 W. Fourth St. North, Middleton, ID (US) 83644

( * ) Notice: Subject to any disclaimer, the term of this patent is extended or adjusted under 35 U.S.C. 154(b) by 0 days.

(21) Appl. No.: 11/686,353

(22) Filed: Mar. 15, 2007

(51) Int. Cl.
G02B 6/36 (2006.01)
G02B 6/00 (2006.01)

(52) U.S. Cl. ...................... 385/135; 385/134
(58) Field of Classification Search ........................ None
See application file for complete search history.

(56) References Cited

U.S. PATENT DOCUMENTS

| | | | |
|---|---|---|---|
| 4,428,645 A | 1/1984 | Korbelak et al. | |
| 4,913,522 A | 4/1990 | Nolf et al. | |
| 5,074,635 A | 12/1991 | Justice et al. | |
| 5,080,459 A * | 1/1992 | Wettengel et al. | 385/95 |
| 5,278,933 A | 1/1994 | Hunsinger et al. | |
| 5,323,478 A | 6/1994 | Milanowski et al. | |
| 5,323,480 A | 6/1994 | Mullaney et al. | |
| 5,544,273 A * | 8/1996 | Harrison | 385/135 |
| 5,689,605 A | 11/1997 | Cobb et al. | |
| 5,835,657 A | 11/1998 | Suarez et al. | |
| 5,956,449 A * | 9/1999 | Otani et al. | 385/134 |
| 6,304,707 B1 | 10/2001 | Daems et al. | |
| 6,490,727 B1 | 12/2002 | Nazarathy et al. | |
| 6,507,691 B1 | 1/2003 | Hunsinger et al. | |
| 6,819,857 B2 | 11/2004 | Douglas et al. | |
| 6,918,786 B2 * | 7/2005 | Barker et al. | 439/540.1 |
| 7,054,535 B2 | 5/2006 | Spayes et al. | |
| 7,072,559 B2 | 7/2006 | Giordano et al. | |
| 7,113,687 B2 | 9/2006 | Womack et al. | |
| 2004/0175090 A1 | 9/2004 | Vastmans et al. | |
| 2005/0249474 A1 | 11/2005 | Tan | |
| 2007/0104447 A1 * | 5/2007 | Allen | 385/135 |

* cited by examiner

*Primary Examiner*—Tina M Wong
(74) *Attorney, Agent, or Firm*—Your Intellectual Property Matters, LLC; Robert A. Frohwerk

(57) ABSTRACT

A fiber optic splice organizer stores optical fiber splices and sufficient slack to permit the fibers to be readily separated, such as for reorganization or to remake a splice. Multiple hinges connect a plurality of fiber trays side by side to provide pivotable connections between trays. A flat orientation of the trays enables splicing and coiling of fibers as they are loaded into a tray. The trays then pivot into a fiber storage position. Special features of the hinges provide support for fibers and splices as they are loaded into the trays. The hinges protect the fibers as the trays are pivoted as well as when the trays are in their folded position for storage without requiring buffer tubes. Multiple architectures for the organization of fibers are enabled without violating minimal bend radii, and while providing for ease of separation of individual fibers or groups of fibers.

10 Claims, 10 Drawing Sheets

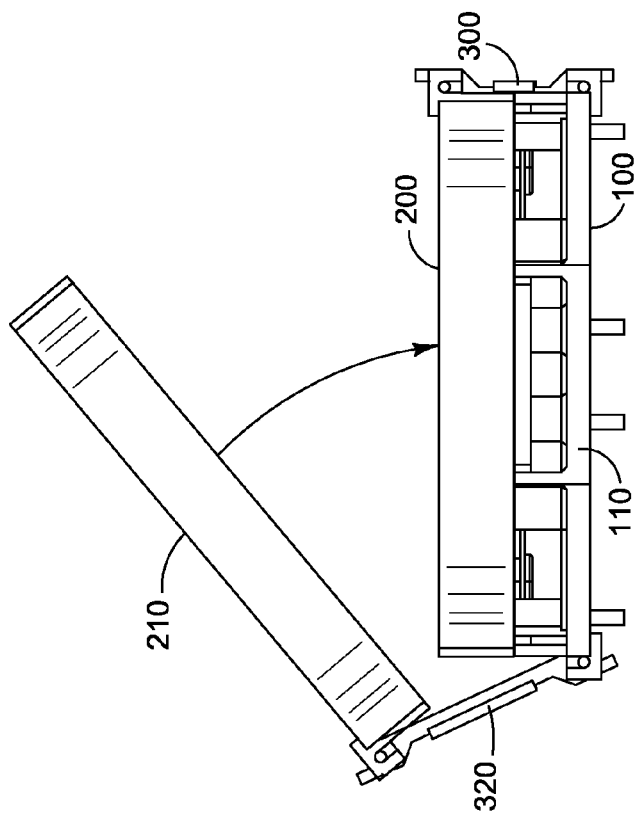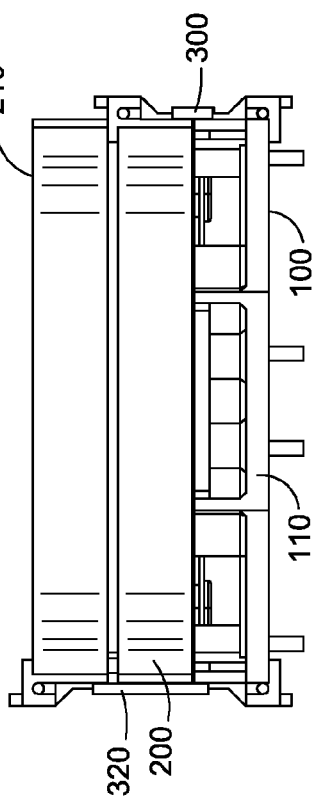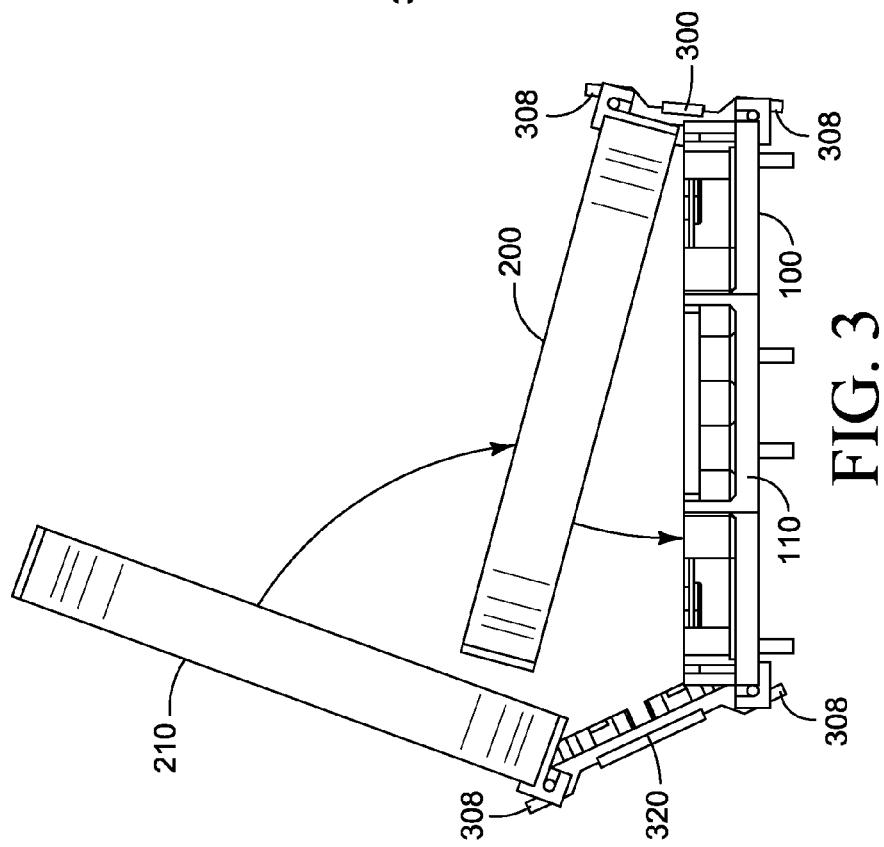

FIBER OPTIC CATEGORIZATION AND MANAGEMENT TRAY

CROSS-REFERENCES TO RELATED APPLICATIONS

Not Applicable.

STATEMENT REGARDING FEDERALLY SPONSORED RESEARCH OR DEVELOPMENT

Not Applicable.

FIELD OF THE INVENTION

The present invention relates generally to a system of support for splicing of optical fibers from fiber optic cables. More particularly, the present invention relates to an assembly of hinged trays for organizing optical fibers, positioning them for proper coupling, for categorizing them into functional groups, and for storing associated excess cable.

BACKGROUND OF THE INVENTION

With rapid growth in customer demand for ever-increasing bandwidth to support transmission of interactive voice, video and data, the telecommunications industry has outgrown the capability of copper wire. The hunger for a supply of information at first moved slowly from the 56-kbps rate offered by dial-up modems to the greater bandwidth offered by DSL. However, access to broadband transmissions at the 640-kbps capacity of DSL only served to whet the appetites of consumers of data who have come to demand even higher rate feeds as more applications are developed to access and use more and more data, such as HDTV and video on demand. To extend their reach beyond the 10-km limitation imposed by DSL over copper wire, telecommunications and cable providers have been forced to employ optical fibers and extend them ever closer to more of their customers.

Optical fibers are capable of carrying virtually noise-free signals that may be extended for very long distances without the need for an amplifying repeater. This has allowed fiber optic networks to move closer to the home and office. Often these greater distances exceed the length of optical fiber cables that can be manufactured, requiring the inclusion of splice points along the route. In other cases a bundle of fibers may need to be tapped at a drop point to provide access to customers along the route. Fiber to the Home, Neighborhood and Office (FTTH, FTTN, and FTTO) presents new challenges in fiber management for routing, splitting, and combining signals as these so called Deep-Fiber (DF) applications are deployed.

Outside-plant installations of optical fibers typically package twelve fibers in a loose-tube cable. In high-density service areas, loose-tube cables containing 36 or as many as 200 fibers may be used, in which case the cable is generally made up of multiple smaller bundles of fibers packaged in color-coded plastic buffer tubes. This modular buffer tube design permits easy drop-off of groups of fibers at intermediate points along a route without interfering with other protected intact buffer tubes being routed to other locations. The loose-tube cable configuration is amenable to aerial, duct and direct-burial applications.

To make splices and feed drop points, the optical fibers within a buffer tube must be exposed by removal of their protective coverings. As each individual fiber is spliced to another fiber, by fusion or other mechanical techniques, to extend the reach of the transmission, the resulting splice must be physically supported and protected from the elements before being placed into service. The splicing operation is often carried out in a transportable clean-room which can be relocated as necessary to access the fiber optic cables on location. Since the cables will either be suspended from utility poles or buried underground, there must be sufficient excess cable to accommodate movement of the splices to the clean work environment. Furthermore, there must be sufficient excess fiber length relative to the length of the buffer tube, typically from one to four meters of slack, to allow the technician to comfortably test and organize the individual fibers.

A variety of splice trays have been developed to provide support for the splices and specialized housings have been produced to protect the splice trays from the environment. Most of these trays also accommodate sufficient storage of the excess slack fiber that is no longer protected by a buffer tube. One popular "Fiber Optic Splice Closure" (FOSC) has been described by Mullaney, et al. in U.S. Pat. No. 5,323,480. Assigned to Raychem Corp., this FOSC has been developed into a series of systems of splice trays with associated outer protective housings. Many other parties have developed similar assemblies some of which may be interchangeable. U.S. Pat. No. 5,074,635 issued to Justice, et al. and assigned to the 3M Company, disclosed what has become a popular splice tray.

Splice trays are generally designed with an attempt to offer some organization for individual splices. This attempt is challenged and limited in many regards. Though a splice tray must permit the supportive mounting and protection of individual splices and storage of the slack optical fibers in a relatively neat configuration, space is limited. Storage of a sufficient amount of slack to enable splicing is most often achieved by forming the optical fibers into a series of loops. However, a minimum bend radius must be carefully observed when handling and storing optical fibers. Bending a fiber more sharply than a certain radius will, at first, result in increased attenuation of the optical signal. At some tighter radius the fiber will break. The minimum bend radius for a given set of fibers establishes some minimum dimensions for splice trays and their enclosures.

Another consideration in the organization of splices within a tray, or a system of trays, is that the loops of slack fibers frequently become permanently tangled with those of neighboring fibers. This occurs simply in the normal course of splicing and routing of the slack for storage. Occasionally a splice will need to be accessed at a later date in order to be remade or repaired to achieve a splice of sufficient quality for support of a proper optical signal. The Fiber Optic Splice Organizer described in U.S. Pat. No. 5,278,933 to Hunsinger, et al., issued Jan. 11, 1994, is one attempt for securing optical fiber splices and slack which permits separation of the spliced fibers to facilitate remaking of a splice. U.S. Pat. No. 6,507,691, issued to Hunsinger, et al., is another one in a series of patents owned by Tyco/Raychem which includes the above-mentioned Mullaney ('480) patent. Taken together these patents show the use of a plurality of splice trays hinged together at a common end and mounted within a single housing.

A stack of splice trays that are so configured offers some capability for segregating buffer tubes from one tray to another, but provides no assistance for organizing fibers once removed from the buffer tube. Such a system of stacked trays limits access to one tray at a time. In U.S. Pat. No. 4,913,522, Nolf, et al. make a point of mentioning that with their (Raychem) tray design "hinging allows chosen trays to be exposed for installation of the splice or for repair etc." This is an advantage in that only one tray at a time is exposed to potential damage while the fibers stored in all other trays remain protected. A disadvantage of such a system is that access to the fibers contained by any particular tray is restricted by the extent to which other trays within the stack may be folded out of the way or the working tray may be removed from the stack, without over-bending any of the fibers.

With perhaps as many as 300 users being supplied by three optical fibers, a single twelve-strand buffer tube in a fiber cable can provide networking to many housing subdivisions. This high-density is convenient for new installations that have not yet gone "live" and provides efficient use of currently deployed fibers. Once an optical network has been activated, however, handling of a single delicate fiber that is feeding a large number of subscribers carries a significant exposure to liability which often corresponds to very large insurance premiums paid by those technicians who work in trays containing active fibers. Furthermore, service providers are at risk of dissatisfying customer with unscheduled outages if fibers are broken. This risk suggests that active (Light, live, or hot) fibers should be segregated and provided with greater protection than those that are inactive (Dark, dead, or cold) while storing the latter for future expansion of the network.

To be useful a splice tray must provide support for splices that have already been prepared and for access to those splices for repair or for activation as the network is extended. The tray must also provide adequate storage for slack fiber associated with the splices without bending any individual fiber more tightly than its minimal bend radius.

It would be an advancement to the state-of-the-art to provide a system of splice trays that would allow for categorization of fibers removed from a single buffer tube as well as between buffer tubes. An additional advancement would be provision for management of Dark, inactive fibers for future expansion without disturbance to Light, active ones. The ability to simultaneously access multiple trays within an enclosure, without folding other trays out of the way as has been required by previous systems, would be a further advancement.

BRIEF SUMMARY OF THE INVENTION

The present invention improves the state-of-the-art in the management of fiber optic field cabling infrastructure. The described invention is a multilevel folding fiber management tray, which enables easier routing and improved protection for network expansion. A folding tray that is generally planar when in its open position provides space for more fiber network components than does a stack of trays while also improving the routing of the fibers. Additionally, the preferred embodiment which uses three trays in a tri-fold configuration allows for separation of fiber categories into groups of Forward, Reverse, and Control, like that used in the deep fiber architecture of Aurora Networks. In another embodiment the three trays may be used at the interface between copper and optical fiber for segregation of Hybrid, Fiber and Coax (Copper), an HFC architecture. Furthermore, provision is made for segregating active (Light) fibers from those that are inactive (Dark). Having separate categorization trays improves the routing of fibers by allowing the active networks to be placed in a protected region at the bottom of the tray where they will not be disturbed as new networks are activated. This feature improves reliability for active networks.

Implementation of the present invention begins with a single base tray which provides mounting points for its firm attachment to an external protective housing. The tray is generally shaped as a rectangular oval having sufficient width to comfortably accommodate loops having diameters that comply with the minimum bend radius of the fibers that will be installed on it. The length of the tray is on the order of triple its width. This length provides for storage of two sets of loops of fibers separated from each other with sufficient space between the two sets of loops to accommodate a bank of splice holders. By orienting the splice holders lengthwise in the tray, there is little concern about maintaining minimal bend radius at the ends of the splices. Guide means included within the tray serve to guide optical fibers around a predetermined bend radius. Additional guide means facilitate the entry and exit of fibers to and from the tray and functional separation of active and inactive fibers.

For a two-tray, bi-fold system, a second tray, similar to the base tray but without the mounting feature, is located alongside of the base tray and the two are connected by special hinges. With dual pivot axes separated by a distance on the order of double the depth of the trays, these special hinges allow for the second tray to be folded over the top of the base tray in a face-to-face manner without interference. This is accomplished by the fact that each pivot axis allows the hinge and its connected tray to swing through an arc of 90°. In this manner the hinge readily supports the two trays in a coplanar orientation when the organizer is opened, and allows them to be folded closed, one on the other, without binding.

Guide means included on the face of each hinge are positioned so as to guide fibers from each tray through the hinge to the other tray. When the trays are in their open, coplanar orientation, these guides provide for ready access to the fibers for routing. As the trays are folded into a closed position, the same guide means on the hinges serve to support and protect the fibers while maintaining an appropriate bend radius.

The addition of a third tray produces a tri-fold categorization and management system. The third tray is located alongside of the base tray at the long edge opposite that to which the second tray was attached. Connections between the base tray and the third tray are established by another set of special hinges having the same features as the first set of special hinges. The primary difference between this second set of hinges and the first set is that the distance between the pivot axes of the hinges now corresponds to approximately triple the depth of the trays. This extra spacing is necessary to allow the third tray to fold up and over the top of the second tray when the second tray is in its closed position folded over the top of the base tray. This second set of hinges contains guide means similar to the first set of hinges but with somewhat different spacing to accommodate the greater distance.

The result is a tri-fold organizer that folds into a space having a top plan view footprint of a single tray with triple the thickness of a single tray. In its closed position, the organizer provides protection for the contents of all three trays. Furthermore, in the closed position the guiding hinge surface and respective side walls of the trays create a set of essentially coplanar surfaces to support and protect the fibers while maintaining adequate bend radii. When unfolded to its open position, all three trays of the organizer and their associated hinges become effectively coplanar. The open position provides three readily accessible trays into which optical fibers, and possibly other related conductors, may be easily separated as three categories to be identified by the user. Without regard to whether the organizer is opened, closed, or in transition between the two positions, the transfer distance across the hinges between trays is always supported and protected.

BRIEF DESCRIPTION OF THE DRAWINGS

The particular features and advantages of the invention as well as other objects will become apparent from the following description taken in conjunction with the accompanying drawings, in which:

FIGS. 3-5 show end views of the tray system during the transition from an open position to a closed position;

Figure 1:
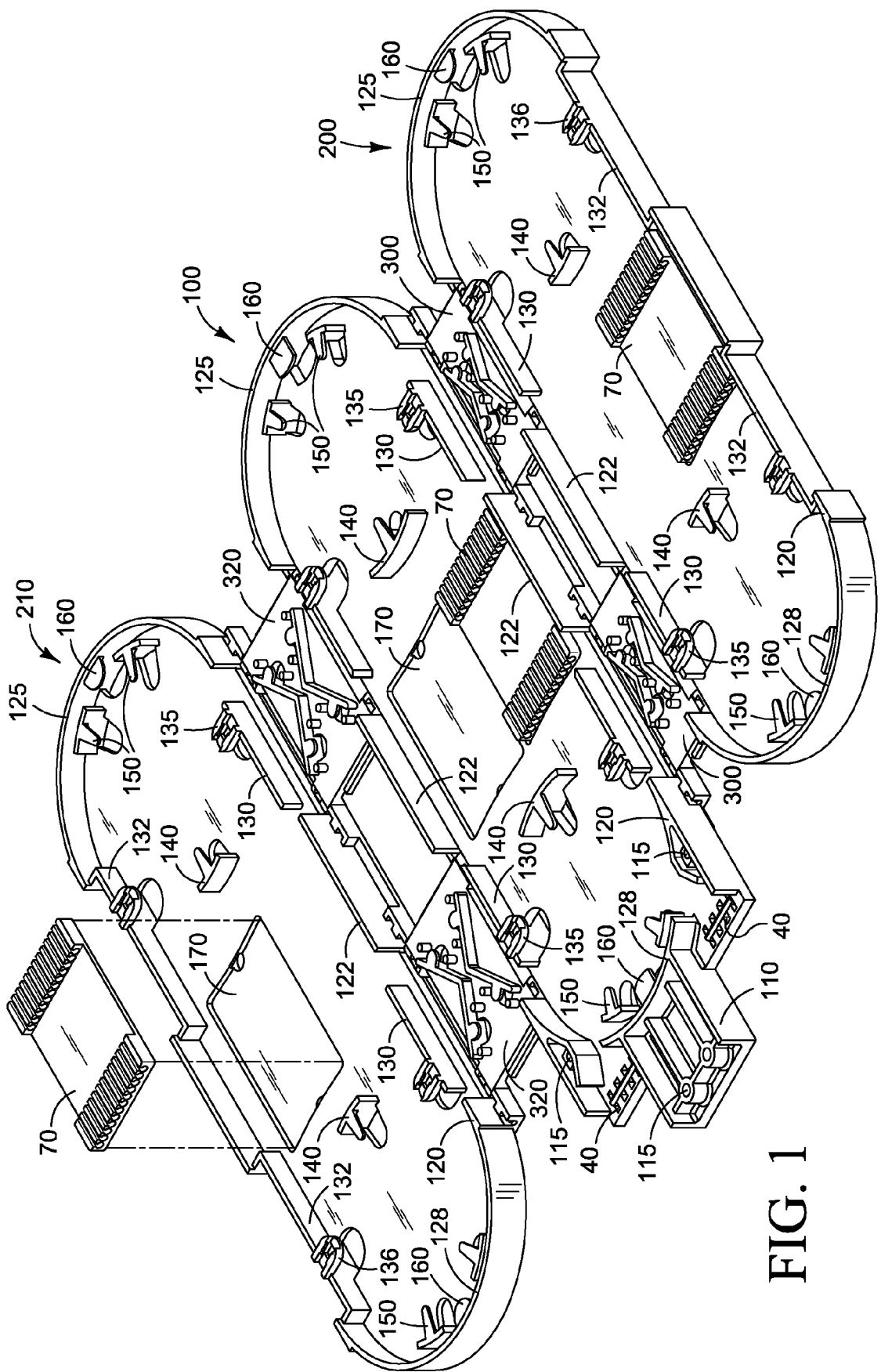
FIG. 1 is an isometric view of a tray system constructed according to the present invention in an open, flat position.

The following Reference Numbers may be used in conjunction with one or more of the accompanying FIGS. 1-13 of the drawings:

20-22 buffer tubes
30 strain relief fastener
40 strain relief holes
50 optical fiber
51-56 route for active (Light) optical fibers
57 route for inactive (Dark) optical fibers
61, 63, 65 splices
70 splice holder
100 base tray
110 mounting bracket on 100
115 mounting holes
120 outer sidewall, proximal
122 outer sidewall, medial
125 outer sidewall, distal, arcuate
128 outer sidewall, proximal, arcuate, part of 110
130 inner sidewall, hinge barrier
132 inner sidewall, integral
135 guide tab on 130
136 guide tab on 132
140 guide post, medial
150 guide post, distal, with guide tab
160 guide tab, part of 125
170 pad, splice holder mounting area
200 tray, second, right-hand
210 tray, third, left-hand
300 hinge, right-hand tray
302 hinge pin
304 channel on hinge for pin
306 channel on tray for hinge pin
308 hinge stop
310 guide posts on hinge
312 guide walls with tabs on hinge
314 tabs on hinge guide walls
320 hinge, left-hand tray

DETAILED DESCRIPTION OF THE INVENTION

The categorization and management system of the present invention will now be described in detail beginning with reference to FIG. 1. Assembly of the system in its preferred embodiment begins with a base tray 100 that is hingedly connected on its right to a second, right-hand tray 200, and on the left to a third, left-hand tray 210. The connections between the base and right-hand trays are provided by hinges 300, while hinges 320 connect the left-hand tray 210 to the base tray 100. All connections between hinges and trays are provided by pins 302.

The right-hand tray 200 and the left-hand tray 210 are identical to one another, differing only in that they have been rotated within their planes by 180° from one another. With the exception of the mounting bracket 110 and strain relief elements 40, the outer trays 200 and 210 have the same features as the base tray 100. It is to be noted that, in one alternate embodiment, a smaller organizer can be constructed using only two trays by omitting the left-hand tray 210. If only two categories of conductors are to be managed, a two-tray system will be sufficient and will provide all of the protective features of the three-tray system.

Figure 2:
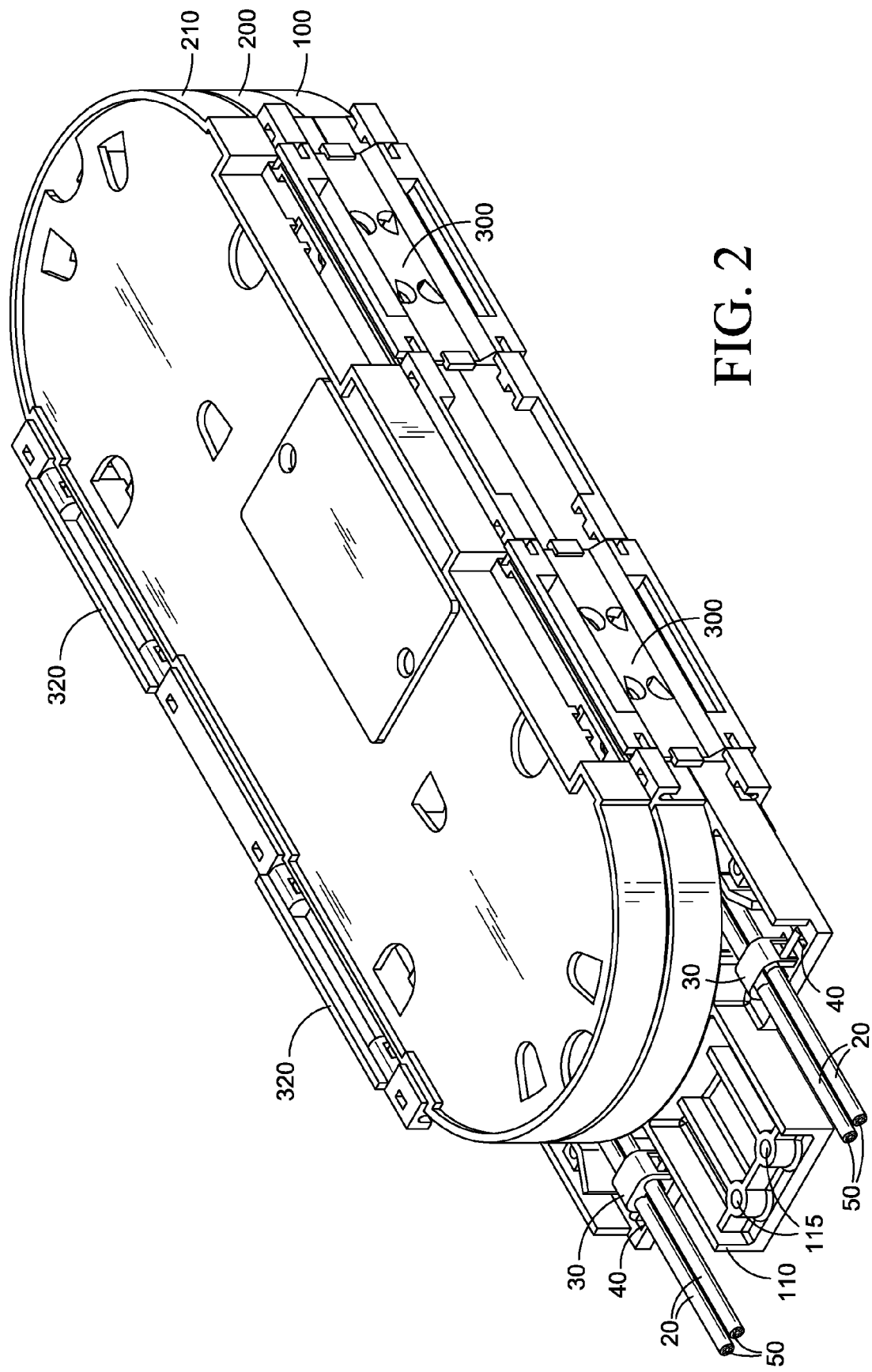
FIG. 2 is an isometric view of the tray system in a closed, folded position.

With the organizer in its open position, all trays (100, 200 and 210) along with their connecting hinges (300 and 320) are effectively coplanar so that they lie flat on a workbench or other surface, providing easy access for loading and adjusting the contents of all trays. When folded into its closed position, as can be seen in FIG. 2, the organizer of the present invention has a footprint equivalent to that of a single tray. The overall thickness of the organizer has a depth approximately equivalent to the sum of the depths of the individual trays, for instance, a tri-fold tray system will have the same thickness has three trays stacked on top of one another, since that is exactly what occurs as the system is folded into its closed position. In its closed position, the organizer provides protection for the contents of all trays, without regard to their number.

With assembly of the organizer having been completed, the base tray 100 is next firmly attached to an exterior housing by using screws through the mounting holes 115 in mounting block 110. A buffer tube 20 containing some quantity of optical fibers (50) is inserted into the housing. The buffer tube 20 is placed on the base tray 100 and secured with cable ties 30 through strain relief tie-down holes 40. After exposing a sufficient length, generally 1-4 meters, of the individual optical fibers 50 by removal of the protective buffer tube, the fibers 50 may be separated into categories and routed throughout the three trays as desired.

The folding operation from an open position to a closed position is depicted in the sequence of end views FIGS. 3, 4 and 5. In FIG. 3, it can be seen that the right-hand tray 200 has been folded over the top of the base tray 100. In FIG. 4 the right-hand tray 200 has been dropped to close the space over the base tray 100. If this were the alternate embodiment having only two trays, the resulting organizer would at this point be effectively closed with all of its contents fully protected. The tray system is held in the closed position by means of a strap, not shown in the figures. In the preferred embodiment containing three trays, with the right-hand tray 200 in its closed position, the left-hand tray 210 is folded over the top of the right-hand tray 200. The result is a tri-fold organizer shown in FIG. 5 in which it can be seen that the contents of all three trays are now fully enclosed and protected.

Figure 6:
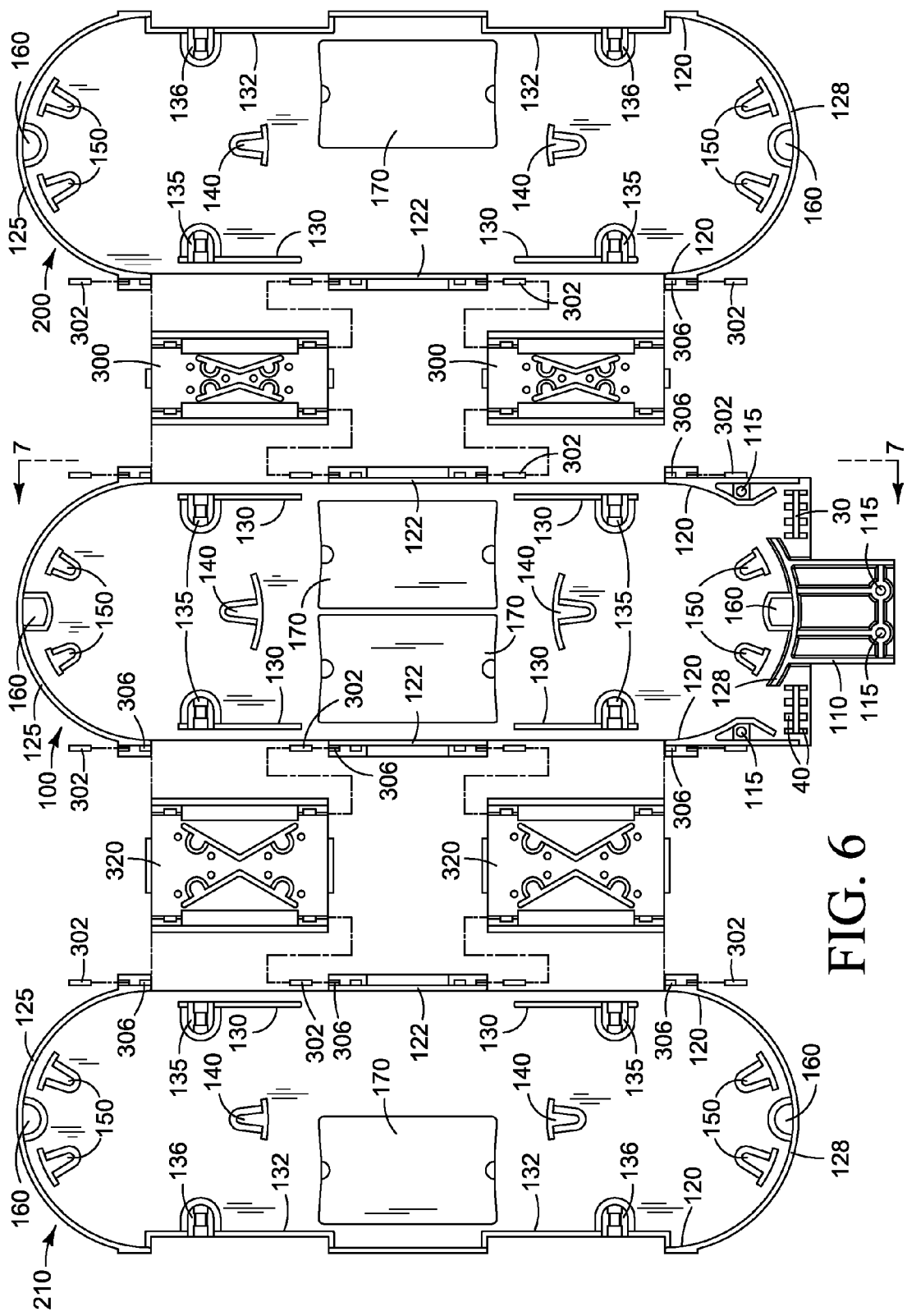
FIG. 6 is an assembly drawing of the tray system showing its individual components.
Figure 7:
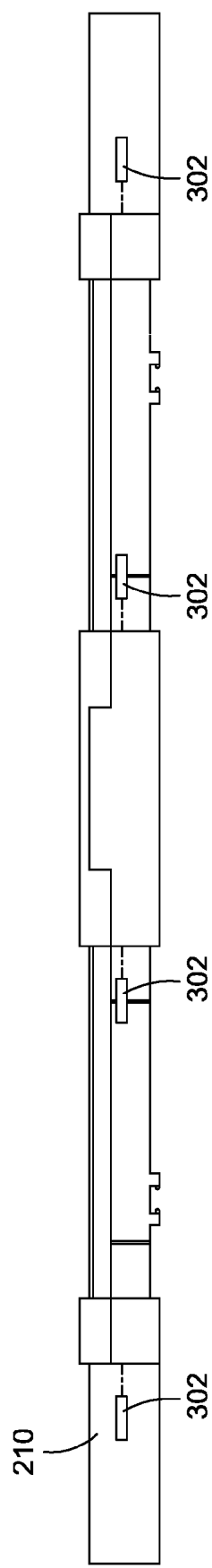
FIG. 7 is a side view of the center tray taken along the line 7-7 of FIG. 6.
Figure 8:
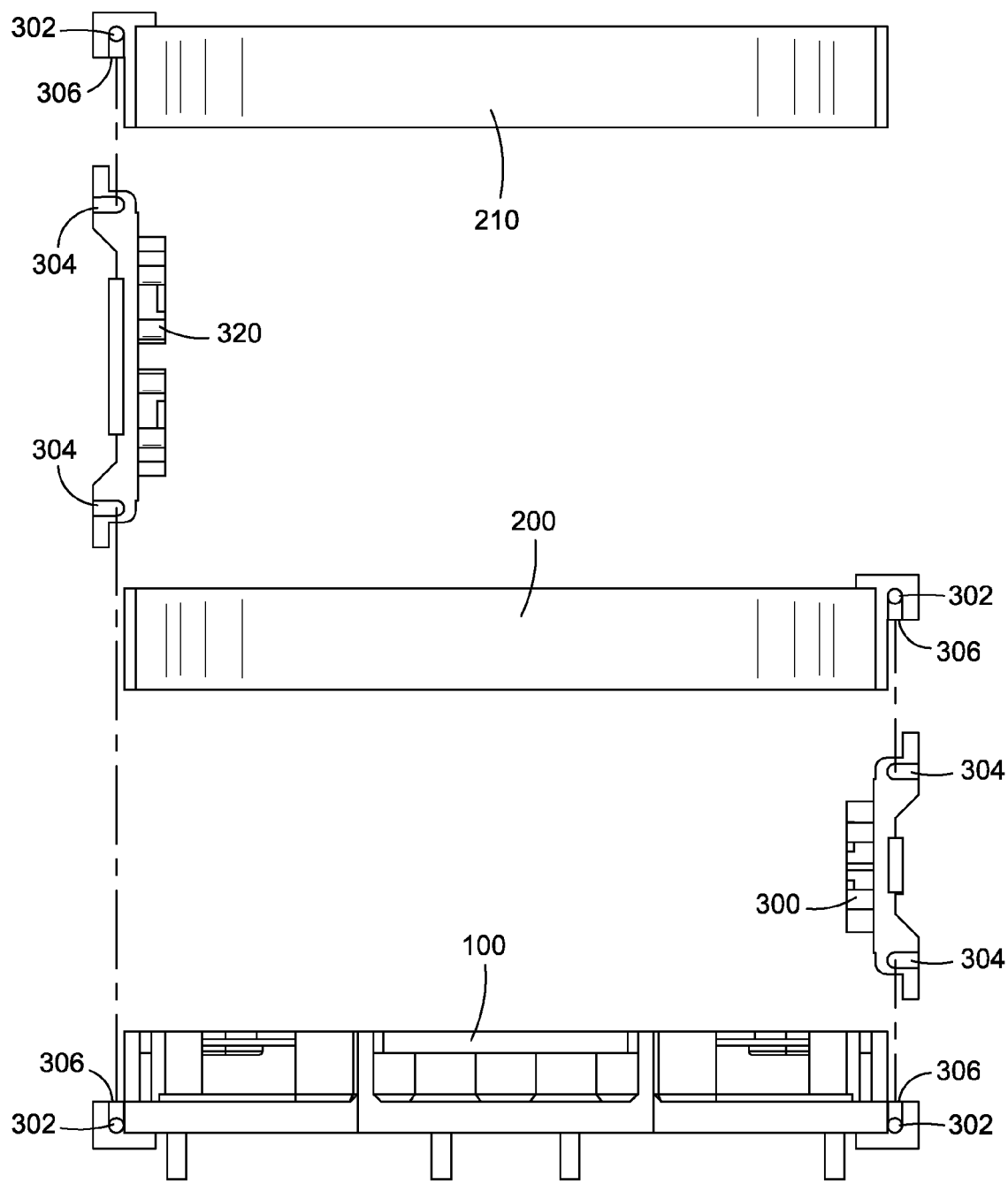
FIG. 8 shows an expanded end view of the tray system in a folded position.

The assembly plan view of FIG. 6 shows how the hinges (300 and 320) are pinned to the trays (100, 200 and 210) to facilitate a coplanar layout in the open position and to provide the necessary flexibility for the transition to a closed position. FIG. 7 shows a side view of the long edge of a tray, all trays appearing similar in this view. A hinge pin 302 is inserted into aperture 306 on a tray and passes through channel 304 on a hinge 300 to be seated. Those skilled in the art of hinge design will recognize that there are many ways to accomplish such a hinged connection. One alternative includes a hinge snap design which offers some advantage to manufacturing. The exploded end view of a tri-fold system is shown in FIG. 8. Here it will be noted that hinges 300 which connect the right-hand tray 200 (in the middle of the figure) to the base tray 100 have sufficient length between their pivot points to span the depth of two trays. Furthermore, the left-hand tray 210 is connected to the base tray 100 with hinges 320 which have an extent between their pivot points to span the depth of three trays.

It is to be noted that a four-tray system could be assembled with the addition of one more tray to the far left of the left tray 210. The fourth tray would be connected to the left-most edge of the left-hand tray 210 using hinges that are identical to those used for the right-hand tray 200, namely hinge 300 having a length appropriate to the depth of a two-tray stack. In this case the left-most tray would be folded over its neighbor, the left-hand tray 210, then that combination of two trays would be folded as a unit over the folded right-hand tray 200 in the same manner as the left-hand tray 210 of the three tray system. To accommodate such an assembly, the hinges 320 between the left-hand tray 210 and the base tray 100 would need to be extended to match a four-tray depth as spacing between their pivot points.

While it is possible to extend the described folding operations to stacks of more than four trays, the desirability of doing so is diminished. As one practical point, standard housings for enclosing trays of this type are typically constructed to accommodate a maximum of four trays. An additional consideration is that, as a categorization system, there is little need for even four categories, and less need for more than four categories. Practicality aside, the present invention may be extended by attaching more trays and folding, or rolling, them into a larger stack. It will be recognized by those skilled in the art that stacks of more than four trays will require additional combinations of hinges having appropriate depths and that trays beyond the first four will need to be adjusted in width if a stack of uniform outer width is desired. In all cases the present invention provides without limit for a tray management system that in the closed position provides full protection of the contents of all trays, and in their open position all trays are coplanar and their contents are simultaneously readily accessible.

Figure 9:
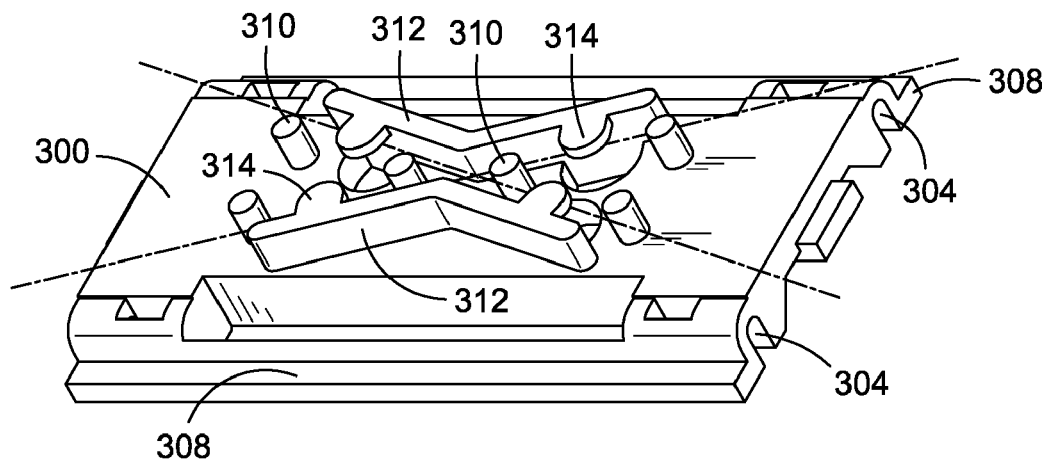
FIG. 9 shows an isometric view of a hinge used between the center and right-hand trays.
Figure 10:
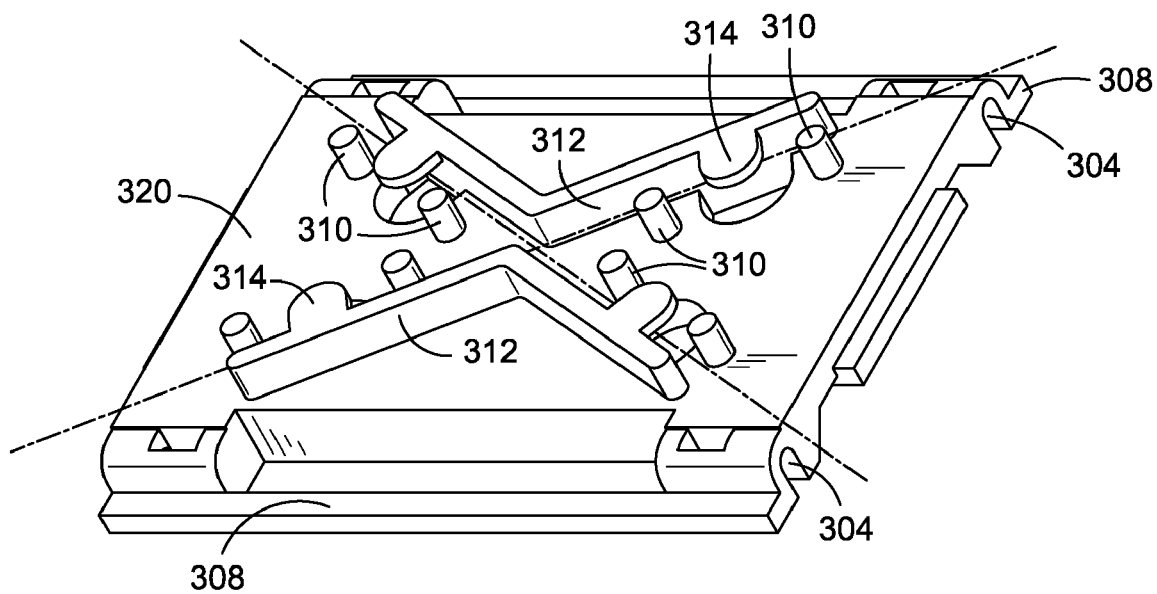
FIG. 10 shows an isometric view of a hinge used between the center and left-hand trays.
Figure 11:
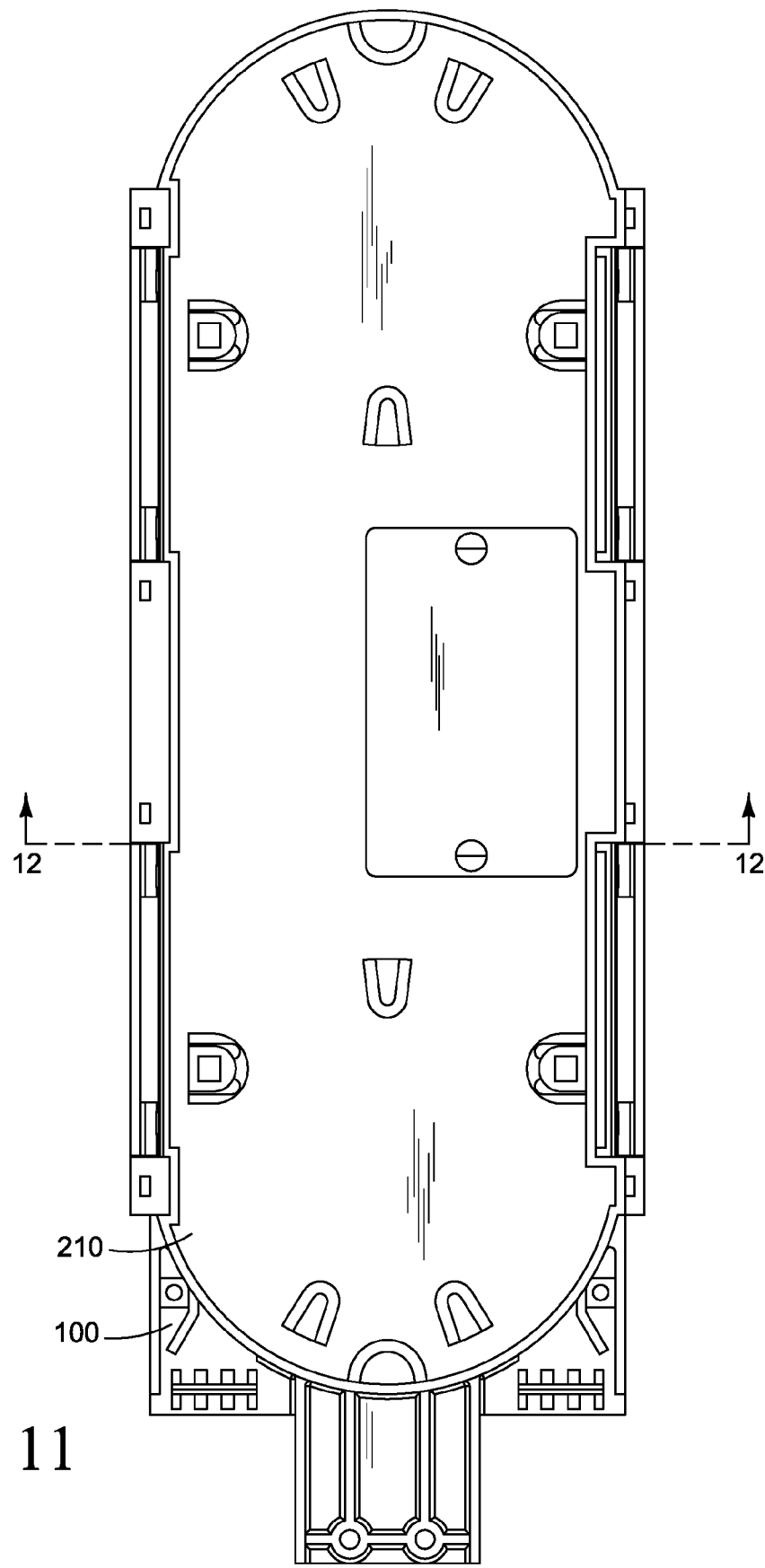
FIG. 11 is a top plan view of the tray system in a closed position.
Figure 12:
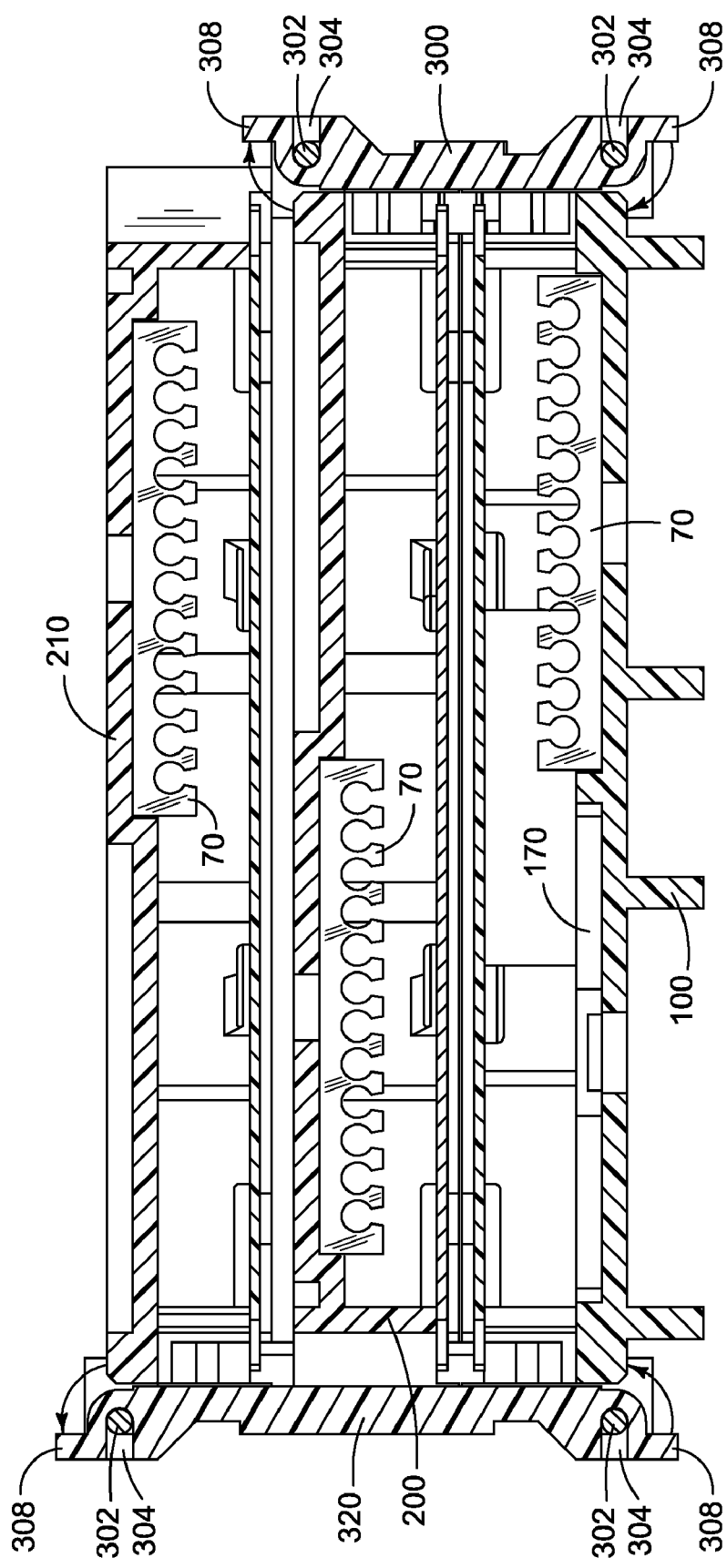
FIG. 12 is a cross-sectional view taken along line 12-12 of FIG. 11.

Details of the hinges are shown in FIG. 9 for the right-hand hinges 300, while FIG. 10 shows the left-hand hinges 320 of the three-tray organizer of the preferred embodiment. All hinges contain guide walls 312 with overhanging tabs 314 that serve as a capture means. These work in conjunction with guideposts 310 to capture and support fibers 50 as they pass through a hinge (300, 320) from one tray to another, holding the fibers as the hinges are maneuvered to open and close the trays A detailed top plan view of a three-tray system appears in its folded closed position in FIG. 11. Taking a sectional view through the location identified in FIG. 11 yields an end view of the closed three-tray stack shown in FIG. 12. Here it can be seen that as the trays are unfolded, hinge stop 308 will come to rest against the bottom of the adjacent tray. This acts to prevent the trays from opening beyond their desired flat coplanar position.

Figure 13:
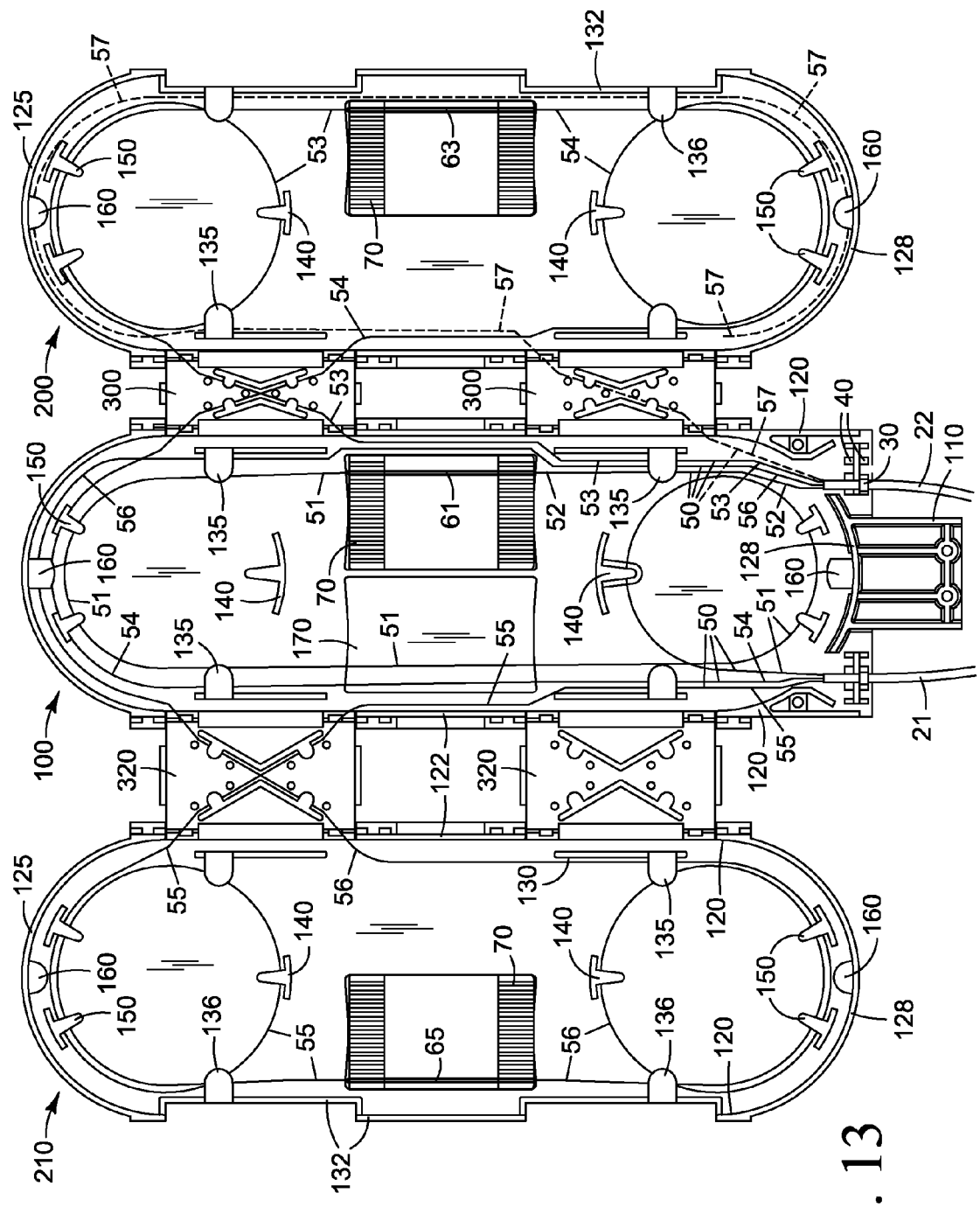
FIG. 13 shows a top plan view of the tray system in an open position with schematic representation of fibers routed through a few of the many possible paths.

Refer now to FIG. 13 for a depiction of the elements common to each of the trays. The outer surface of outer sidewalls (120,122, 125 and 128) provide protection of the contents of each tray, while the inner surfaces of those outer sidewalls serve as guides for routing of the stored conductors. Inner sidewalls 130 with guide tabs 135 provide additional guidance. The guide means are rounded out by guide posts 140 and 150, each having their own guide tabs, and guide tab 160 on the inner wall of the outer sidewall 125. All guide tabs work in conjunction with their associated guide posts and guide walls as capture means to hold fibers loosely in place as the trays are handled and then to keep the fibers from falling out of place as the trays are folded into an inverted position. Additional protection is provided by a cover sheet (not shown). Generally made of a clear plastic, this cover sheet is snapped over each tray before the tray system is folded closed.

Pads 170 centrally located in each tray are provided for mounting of splice holder 70. Suitable splice holders 70 are available as industry-standard components and may be placed in, or omitted from, each tray as desired. This region may also be used to accommodate splitters and combiners, in addition to splices.

Routing of the conductors throughout the tray system will now be discussed with continued reference to FIG. 13 using exemplary routing paths 51-56 for active (Light) fibers and routing path 57 for inactive (Dark) ones. With the buffer tubes 21-22 firmly secured to the base tray 100 by fastener 30 at strain relief 40, a suitable length of the individual optical fibers 50 will be exposed prior to routing throughout the categorization and management tray system of the present invention. Initially, a fiber will follow along the inside wall of one section of the outer sidewall 120. If a length of slack fiber is to be stored within a tray, it may be formed into loops at either end of the tray. One set of loops may be located at the proximal end of the tray, near the mounting and entry point, while another set of loops may be formed at the distal end of the tray. A few of the many potential paths are depicted schematically by routes 51 and 52 in the base tray 100, routes 53 and 54 in the right-hand tray 200, and routes 55 and 56 in the left-hand tray 210. It is to be noted that, in these examples, the fibers in routes 51 and 52 are connected through splice 61, while the fibers following routes 53 and 54 connect through splice 63, and routes 55 and 56 carry fibers that connect through splice 65. An outer "trench" is provided by the present invention for the storage of additional fiber, especially of unused Dark fibers. One possible such path is represented by route 57.

A pair of straight outer sidewall segments 122 align with curved endwall segments 125 and 128 to guide long runs of fiber 50. In traveling from one end of a tray to the other end, a fiber 50 will be laid down in a "trench" that is bounded at the outside by the inward-facing surfaces of the outer sidewall segments 122, 125 and 128 and the inward-facing surfaces of the inner sidewall segments 130. This outer trench extends into the ends of the tray to work in conjunction with the outward-facing surfaces of guide posts 150 which keep the run of fiber from collapsing toward the center of the tray providing a path for crossing from one side of a tray to the other while keeping the center of the tray clear.

To store slack fiber, guide posts and guide tabs are positioned to contain a set of loops at each end of each tray. Guide posts 140 and 150 each have overhanging tabs facing inward toward other guide posts. In addition to these, the inner sidewall segments 130 also have inward facing tabs 135. Fibers may be coiled into loops and tucked below these tabs for storage of slack. Taken as a group, these tabs are spaced so as to establish a proper working diameter that does not violate the minimum bend radius of a fiber that is contained by them.

Near the center of each tray are pads 170 where a splice holder 70 may be attached. This area is of sufficient length to allow straightline entry to and exit from a splice without interfering with the storage loops at the ends of the tray.

Gaps between the outer sidewall segments (120, 122, 125 and 128) and the inner sidewall segments 130 are located so as to provide access to the hinges so that a fiber 50 may travel from one tray to a neighboring tray, such as from the base tray 100 to the right-hand tray 200 through hinges 300 as depicted by routes 54, 54 and 57. Similar gaps in the destination tray allow the fiber 50 to continue beyond the hinge region in order that it may be formed into loops or placed into a splice holder on that tray as appropriate. Inner sidewall segments 130 serve to create a "keep out" zone for fibers running past them, since any loose fibers in the region to the outside of those guides would likely be pinched by the closing of hinges. Guide posts and overhanging tabs on each hinge confine the fiber 50 as it gently crosses the hinge region at a shallow angle avoiding improper bends. Spacing between the sidewall gaps in concert with hinge dimensions serve to stabilize and support the fiber 50 even as the trays are folded one over the other, again avoiding improper bends throughout the rotation.

Using three trays in a tri-fold configuration as in the preferred embodiment allows for conductors to be easily separated into three categories. In one common architecture, the deep fiber architecture used by Aurora Networks, fibers are separated by function and categorized into the standard groups of Forward, Reverse, and Control. Many other deep fiber or Hybrid, Fiber, Coax (known as HFC) architectures can take advantage of the fiber categorization enabled in the present invention.

In order to protect active (Light) fibers from interference and potential damage, it is a feature of the present invention that these critical fibers be looped within the system of guide posts and guide tabs and placed next to the surface of a tray. After the active fibers have been secured in such a protected location, the inactive (Dark) fibers may be routed around the trench formed between the inner sidewalls 130 and outer sidewalls (122, 125 and 128). If so desired, loops may be formed by winding a fiber 50 around the outside of the guide posts 140 and 150 where they receive some support from guide tabs 160 in addition to the cover sheet (not shown) which will be placed over the contents of the entire tray.

Using an organizational method such as this allows the Dark fibers to be easily removed at a later date for activation with minimal disturbance to the tender Light fibers. The present invention has been designed to accommodate network expansion and accordingly enables such an organization which considerably improves the protection of active networks and reduces a technician's exposure to liability for damaged circuits and unscheduled customer service outages.

Various embodiments of the present invention have been described as a system of categorization and management trays. Each embodiment is both compact and robust when the resulting organizer is in its closed position. The trays and hinges open to form a coplanar layout where all trays are readily accessible at the same time. This simultaneous access to multiple trays enables easy separation of fibers, or other conductors, into multiple categories for improved network management in accordance with a variety of management architectures. Location and spacing of guide means minimizes deviations in optical paths as the trays are folded from an open position, for system construction or repair, into their closed position for storage and undisturbed use. Furthermore, a method has been described that uses the present invention to separate optical fibers that are active from those inactive fibers that are being stored for network expansion.

While the present invention has been described with respect to a preferred embodiment, with other alternate embodiments suggested, there is no implication to restrict the present invention to preclude other implementations that will be apparent to those skilled in the related arts. Furthermore, although a particular standard tray and housing format has been used as an example, it is easily recognized that the features of the described invention may be implemented in conjunction with a variety of alternative sub-system components. Therefore, it is not intended that the invention be limited to the disclosed embodiments or to the specifically described details insofar as variations can be made within the spirit and scope of the appended claims.

What is claimed is:

1. An organizer for spliced or split conductors wherein at least some of the conductors are fiber optic, the organizer comprising:
    a plurality of trays; and
    at least one hinge mechanism hingedly connecting each of the trays from the plurality of trays to at least one other tray,
    wherein each tray includes
        a two-sided plate having a generally oval or rectangular shape, and wherein
        a first side of the plate provides a planar support surface, and
    a second side of the plate provides a working surface, the working surface of each tray further including a guide means for guiding the conductors within the tray, and
    wherein a first of the plurality of trays is a base tray, the base tray further including at least one port for the passage of conductors into and out of the organizer, and
    wherein the base tray is flanked along a first edge by a second tray, and
    wherein each hinge mechanism includes a routing means for routing the conductors between adjacent connected trays, and
    wherein each hinge mechanism is operable so as to provide an opened position in which the support surfaces of adjacent connected trays and the hinge mechanism between them are effectively coplanar, facilitating access to the working surfaces of the trays, and a closed position in which the working surfaces of adjacent connected trays are parallel and facing one another.

2. The organizer of claim 1, wherein the conductors are organized into two groups, and
    wherein the base tray is used for storage of conductors from a first of the two groups, and
    wherein the second tray is used for storage of conductors from a second of the two groups.

3. The organizer of claim 2, wherein the two groups of conductors are identified according to their function.

4. The organizer of claim 3, wherein the functions of the two groups of conductors are equivalent to Forward and Reverse.

5. The organizer of claim 1, wherein the base tray is flanked along a second edge opposite the first edge by a third tray.

6. The organizer of claim 5, wherein the conductors are organized into three groups, and
    the base tray is used for storage of conductors from a first of the three groups, the second tray is used for storage of conductors from a second of the three groups, and
    the third tray is used for storage of conductors from a third of the three groups.

7. The organizer of claim 6, wherein the three groups of conductors are identified according to their function.

8. The organizer of claim 7, wherein the functions of the three groups of conductors are equivalent to Forward, Reverse and Control.

9. The organizer of claim 6, wherein the three groups of conductors are identified according to their material composition.

10. The organizer of claim 9, wherein the material composition of the three groups of conductors includes Fiber, Copper and Hybrid, and wherein the Hybrid group includes a mix of Fiber and Copper conductors.

* * * * *